(12) United States Patent
Pan et al.

(10) Patent No.: US 10,917,315 B2
(45) Date of Patent: Feb. 9, 2021

(54) NETWORK SERVICE QUALITY EVALUATION METHOD AND SYSTEM, AND NETWORK DEVICE

(71) Applicant: HUAWEI TECHNOLOGIES CO., LTD., Shenzhen (CN)

(72) Inventors: Lujia Pan, Shenzhen (CN); Caifeng He, Shenzhen (CN); Deti Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 16/048,340

(22) Filed: Jul. 30, 2018

(65) Prior Publication Data

US 2018/0337834 A1 Nov. 22, 2018

Related U.S. Application Data

(63) Continuation of application No. PCT/CN2017/070730, filed on Jan. 10, 2017.

(30) Foreign Application Priority Data

Jan. 30, 2016 (CN) .......................... 2016 1 0067942

(51) Int. Cl.
*H04L 12/24* (2006.01)
*H04W 4/029* (2018.01)
(Continued)

(52) U.S. Cl.
CPC ......... *H04L 41/5038* (2013.01); *H04W 4/021* (2013.01); *H04W 4/029* (2018.02);
(Continued)

(58) Field of Classification Search
CPC .... H04L 41/5038; H04L 43/08; H04W 64/00; H04W 4/029; H04W 4/021; H04W 24/08
(Continued)

(56) References Cited

U.S. PATENT DOCUMENTS

2012/0157089 A1* 6/2012 Yang ........................ H04L 41/50
455/424
2013/0132108 A1 5/2013 Solilov et al.
(Continued)

FOREIGN PATENT DOCUMENTS

CN 1859186 A 11/2006
CN 102355691 A 2/2012
(Continued)

*Primary Examiner* — Faisal Choudhury
(74) *Attorney, Agent, or Firm* — Kilpatrick Townsend & Stockton LLP

(57) ABSTRACT

The method including: obtaining identity information and location information of a user terminal, and monitoring, according to the identity information and the location information, whether the user terminal has moved to a target region; obtaining a target network quality level if the user terminal has moved to the target region, where the target network quality level includes a current network quality level of the user terminal in the target region; querying whether the user terminal has a historical network quality level in the target region; if the user terminal has the historical network quality level in the target region, obtaining the historical network quality level, and evaluating network quality of the user terminal in the target region according to the historical network quality level and the target network quality level.

15 Claims, 7 Drawing Sheets

(51) Int. Cl.
*H04W 64/00* (2009.01)
*H04W 4/021* (2018.01)
*H04W 24/08* (2009.01)
*H04L 12/26* (2006.01)

(52) U.S. Cl.
CPC ............ *H04W 24/08* (2013.01); *H04W 64/00* (2013.01); *H04L 43/08* (2013.01)

(58) Field of Classification Search
USPC ........................................................ 370/252
See application file for complete search history.

(56) References Cited

U.S. PATENT DOCUMENTS

| | | |
|---|---|---|
| 2013/0272150 A1 | 10/2013 | Wan et al. |
| 2013/0282333 A1 | 10/2013 | Mast et al. |
| 2015/0043419 A1* | 2/2015 | Boudreau .............. H04B 7/024 370/315 |
| 2015/0119020 A1* | 4/2015 | Henderson ............ H04W 16/18 455/423 |
| 2015/0373560 A1* | 12/2015 | Chu ....................... H04W 24/02 370/252 |
| 2016/0037379 A1* | 2/2016 | Shafiee ............ H04W 28/0268 370/230.1 |
| 2016/0065419 A1 | 3/2016 | Szilagyi et al. |

FOREIGN PATENT DOCUMENTS

| | | |
|---|---|---|
| CN | 103136629 A | 6/2013 |
| CN | 102625344 B | 8/2014 |
| CN | 104410516 A | 3/2015 |
| CN | 104935446 A | 9/2015 |
| CN | 105264859 A | 1/2016 |
| WO | 103312531 A | 9/2013 |

* cited by examiner

NETWORK SERVICE QUALITY EVALUATION METHOD AND SYSTEM, AND NETWORK DEVICE

CROSS-REFERENCE TO RELATED APPLICATIONS

This application is a continuation of International Application No. PCT/CN2017/070730, filed on Jan. 10, 2017, which claims priority to Chinese Patent Application No. 201610067942.0, filed on Jan. 30, 2016, The disclosures of the aforementioned applications are hereby incorporated by reference in their entireties.

TECHNICAL FIELD

The present invention relates to the communications field, and in particular, to a network service quality evaluation method and system, and a network device.

BACKGROUND

With continuous development of communications technologies, telecommunications network services are diversified, and telecommunications operators are intensely competitive. To improve users' satisfaction with telecommunications network services, telecommunications operators need to evaluate and improve quality of network services they provide, to improve service quality. Currently, in most cases, network service quality evaluation performed by the telecommunications operators is reflected by using parameters such as a key performance indicator (KPI) and a key quality indicator (KQI). However, when network service quality is evaluated by using a KPI and a KQI, only temporal locality is considered, but spatiality is ignored, and independent evaluation is performed for each time sequence. This does not help improve a network abnormality detection effect. In addition, when quality of a particular type of network services is evaluated by using a KQI, because a uniform KQI evaluation criterion (for example, a threshold) is used for all user terminals, individual differences between users are ignored, and network service quality experienced by the users cannot be evaluated precisely.

SUMMARY

Embodiments of the present invention provide a network service quality evaluation method and system, and a network device, so as to improve network service quality evaluation precision, and improve appropriateness and reliability of a network service quality evaluation result by using historical network quality indicators of user terminals to reflect individual differences between different users.

A first aspect of the embodiments of the present invention provides a network service quality evaluation method, including:

obtaining identity information and location information of a user terminal, and monitoring, according to the identity information and the location information, whether the user terminal has moved to a target region;

obtaining a target network quality level when it is detected that the user terminal has moved to the target region, where the target network quality level includes a current network quality level of the user terminal in the target region;

querying whether the user terminal has a historical network quality level in the target region; and when the user terminal has the historical network quality level in the target region, obtaining the historical network quality level, and evaluating network quality of the user terminal in the target region according to the historical network quality level and the target network quality level.

In the network service quality evaluation method provided in the first aspect, it is queried whether the user terminal has the historical network quality level in the target region, and when the user terminal has the historical network quality level in the target region, the historical network quality level is used as a reference factor for evaluating the network quality of the user terminal in the target region, so that a network quality evaluation result can reflect individual differences between different user terminals, and network service experience of different users can be evaluated more precisely, helping improve appropriateness and reliability of a network service quality evaluation result.

With reference to the first aspect, in a first possible implementation of the first aspect, the target network quality level further includes:

a regional network quality level of the target region.

With reference to the first aspect or the first possible implementation of the first aspect, in a second possible implementation of the first aspect, the obtaining the historical network quality level includes:

obtaining at least one historical network quality indicator record of the user terminal in the target region within preset time duration; and when a quantity of the historical network quality indicator records is greater than or equal to a preset threshold, calculating the historical network quality level of the user terminal in the target region according to the historical network quality indicator record.

In the second possible implementation of the first aspect, the preset time duration is set, and only the historical network quality indicator record of the user terminal in the target region within the preset time duration is obtained, thereby ensuring relatively good timeliness of data for evaluating the historical network quality level. In addition, the threshold of the quantity of the historical network quality indicator records is preset, so that the historical network quality level of the user terminal in the target region is calculated according to the historical network quality indicator only when the quantity of the historical network quality indicator records is greater than the preset threshold. In this way, a quantity of data samples for evaluating the historical network quality level can be ensured, a relatively large evaluation result error caused by excessively sparse samples can be prevented, and reliability of the historical network quality level evaluation can be improved.

With reference to the first aspect, in a third possible implementation of the first aspect, the evaluating network quality of the user terminal in the target region according to the historical network quality level and the target network quality level includes:

comparing the current network quality level with the historical network quality level, to obtain a difference between the current network quality level and the historical network quality level; and querying a preset difference-level mapping rule according to the difference, to determine a network quality level of the user terminal in the target region.

With reference to the first possible implementation of the first aspect, in a fourth possible implementation of the first aspect, the evaluating network quality of the user terminal in the target region according to the historical network quality level and the target network quality level includes:

calculating an average of the regional network quality level and the historical network quality level;

comparing the current network quality level with the average, to obtain a difference between the current network quality level and the average; and querying a preset difference-level mapping rule according to the difference between the current network quality level and the average, to determine a network quality level of the user terminal in the target region.

With reference to the first possible implementation of the first aspect or the fourth possible implementation of the first aspect, in a fifth possible implementation of the first aspect, the obtaining a target network quality level includes:

dividing a preset region into a plurality of subregions, where one of the subregions is the target region;

in each subregion, obtaining a historical network quality indicator of at least one user terminal within preset time duration, and performing network quality level feature construction on the historical network quality indicator of the at least one user terminal, to obtain a network quality level feature of the subregion; and clustering network quality level features of the plurality of subregions, and determining the regional network quality level of the target region according to a clustering result.

In the fifth possible implementation of the first aspect, the preset region is divided into the plurality of subregions, so that a regional network quality level evaluation range is finer, helping improve precision of a regional network quality evaluation result. In addition, a regional network quality of the target region is evaluated with reference to a historical network quality indicator of a subregion in the same preset region as the target region, so that reliability of the regional network quality evaluation result can be improved.

With reference to the fifth possible implementation of the first aspect, in a sixth possible implementation of the first aspect, when the user terminal does not have the historical network quality level in the target region, the method further includes:

obtaining a historical network quality level of the user terminal in any subregion other than the target region in the preset region; and evaluating the network quality of the user terminal in the target region according to the historical network quality level of the user terminal in any subregion other than the target region in the preset region and the target network quality level.

With reference to the sixth possible implementation of the first aspect, in a seventh possible implementation of the first aspect, the evaluating the network quality of the user terminal in the target region according to the historical network quality level of the user terminal in any subregion other than the target region in the preset region and the target network quality level includes:

calculating an average of the historical network quality level of the user terminal in any subregion other than the target region in the preset region and the regional network quality level of the target region;

comparing the current network quality level with the average, to obtain a difference between the current network quality level and the average; and querying the preset difference-level mapping rule according to the difference between the current network quality level and the average, to determine the network quality level of the user terminal in the target region.

In the sixth and the seventh possible implementations of the first aspect, when the user terminal does not have the historical network quality level in the target region, the network quality of the user terminal in the target region is evaluated according to the historical network quality level of any subregion other than the target region in the preset region and the regional network quality level of the target region, thereby ensuring that even if the user terminal does not have the historical network quality level in the target region, a network quality evaluation result of the user terminal in the target region can still reflect an individual difference between user terminals, helping improve appropriateness and reliability of the network quality evaluation result.

With reference to the fifth possible implementation of the first aspect, in an eighth possible implementation of the first aspect, when the user terminal does not have the historical network quality level in the target region, the method further includes:

obtaining a historical network quality level of the user terminal in any subregion other than the target region in the preset region; and evaluating the network quality of the user terminal in the target region according to the historical network quality level of the user terminal in any subregion other than the target region in the preset region and the current network quality level.

With reference to the eighth possible implementation of the first aspect, in a ninth possible implementation of the first aspect, the evaluating the network quality of the user terminal in the target region according to the historical network quality level of the user terminal in any subregion other than the target region in the preset region and the current network quality level includes:

comparing the current network quality level with the historical network quality level of the user terminal in any subregion other than the target region in the preset region, to obtain a difference between the current network quality level and the historical network quality level of the user terminal in any subregion other than the target region in the preset region; and querying the preset difference-level mapping rule according to the difference, to determine the network quality level of the user terminal in the target region.

In the eighth and the ninth possible implementations of the first aspect, when the user terminal does not have the historical network quality level in the target region, the network quality of the user terminal in the target region is evaluated according to the historical network quality level of the user terminal in any subregion other than the target region in the preset region. Because the referenced subregion and the target region belong to the same preset region, it can be ensured that a communication condition in the referenced subregion is similar to a communication condition in the target region. Therefore, when the network quality of the user terminal in the target region is evaluated by using the historical network quality level of any subregion as a reference and with reference to the regional network quality level of the target region, an evaluation result can still reflect individual differences between different user terminals when there is no historical network quality level of the target region, thereby improving appropriateness of a network quality evaluation result.

With reference to the fifth possible implementation of the first aspect, in a tenth possible implementation of the first aspect, when the user terminal does not have the historical network quality level in the target region, the method further includes:

evaluating the network quality of the user terminal in the target region with reference to the regional network quality level and the current network quality level.

With reference to the tenth possible implementation of the first aspect, in an eleventh possible implementation of the first aspect, the evaluating the network quality of the user terminal in the target region with reference to the regional network quality level and the current network quality level includes:

comparing the current network quality level with the regional network quality level, to obtain a difference between the current network quality level and the regional network quality level; and querying the preset difference-level mapping rule according to the difference between the current network quality level and the regional network quality level, to determine the network quality level of the user terminal in the target region.

A second aspect of the embodiments of the present invention provides a network service quality evaluation system, including:

a monitoring module, configured to: obtain identity information and location information of a user terminal, and monitor, according to the identity information and the location information, whether the terminal has moved to a target region;

an obtaining module, configured to obtain a target network quality level when it is detected that the user terminal has moved to the target region, where the target network quality level includes a current network quality level of the user terminal in the target region;

a querying module, configured to query whether the user terminal has a historical network quality level in the target region; and an evaluation module, configured to: when the user terminal has the historical network quality level in the target region, obtain the historical network quality level, and evaluate network quality of the user terminal in the target region according to the historical network quality level and the target network quality level.

With reference to the second aspect, in a first possible implementation of the second aspect, the target network quality level further includes:

a regional network quality level of the target region.

With reference to the second aspect or the first possible implementation of the second aspect, in a second possible implementation of the second aspect, the evaluation module is further configured to:

obtain a historical network quality indicator record of the user terminal in the target region within preset time duration; and when a quantity of the historical network quality indicator records is greater than or equal to a preset threshold, calculate the historical network quality level of the user terminal in the target region according to the historical network quality indicator record.

With reference to the second aspect, in a third possible implementation of the second aspect, the evaluation module is further configured to:

compare the current network quality level with the historical network quality level, to obtain a difference between the current network quality level and the historical network quality level; and query a preset difference-level mapping rule according to the difference, to determine a network quality level of the user terminal in the target region.

With reference to the first possible implementation of the second aspect, in a fourth possible implementation of the second aspect, the evaluation module is further configured to: calculate an average of the regional network quality level and the historical network quality level;

compare the current network quality level with the average, to obtain a difference between the current network quality level and the average; and query a preset difference-level mapping rule according to the difference between the current network quality level and the average, to determine a network quality level of the user terminal in the target region.

With reference to the first possible implementation of the second aspect or the fourth possible implementation of the second aspect, in a fifth possible implementation of the second aspect, the obtaining module includes:

a preset region rasterization submodule, configured to divide a preset region into a plurality of subregions, where one of the subregions is the target region;

a regional network quality obtaining submodule, configured to: in each subregion, obtain a historical network quality indicator of at least one user terminal with preset time duration, and perform network quality level feature construction on the historical network quality indicator of the at least one user terminal, to obtain a network quality level feature of the subregion; and a regional network quality evaluation submodule, configured to: cluster network quality level features of the plurality of subregions, and determine the regional network quality level of the target region according to a clustering result.

With reference to the fifth possible implementation of the second aspect, in a sixth possible implementation of the second aspect, when the user terminal does not have the historical network quality level in the target region, the evaluation module is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the target network quality level.

With reference to the sixth possible implementation of the second aspect, in a seventh possible implementation of the second aspect, the evaluation module is further configured to:

calculate an average of the historical network quality level of the user terminal in any subregion other than the target region in the preset region and the regional network quality level of the target region;

compare the current network quality level with the average, to obtain a difference between the current network quality level and the average; and query the preset difference-level mapping rule according to the difference between the current network quality level and the average, to determine the network quality level of the user terminal in the target region.

With reference to the fifth possible implementation of the second aspect, in an eighth possible implementation of the second aspect, when the user terminal does not have the historical network quality level in the target region, the evaluation module is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the current network quality level.

With reference to the eighth possible implementation of the second aspect, in a ninth possible implementation of the second aspect, the evaluation module is further configured to:

compare the current network quality level with the historical network quality level of the user terminal in any subregion other than the target region in the preset region, to obtain a difference between the current network quality level and the historical network quality level of the user terminal in any subregion other than the target region in the preset region; and query the preset difference-level mapping rule according to the difference, to determine the network quality level of the user terminal in the target region.

With reference to the fifth possible implementation of the second aspect, in a tenth possible implementation of the second aspect, when the user terminal does not have the historical network quality level in the target region, the evaluation module is further configured to:

evaluate the network quality of the user terminal in the target region with reference to the regional network quality level and the current network quality level.

With reference to the tenth possible implementation of the second aspect, in an eleventh possible implementation of the second aspect, the evaluation module is further configured to:

compare the current network quality level with the regional network quality level, to obtain a difference between the current network quality level and the regional network quality level; and query the preset difference-level mapping rule according to the difference between the current network quality level and the regional network quality level, to determine the network quality level of the user terminal in the target region.

A third aspect of the embodiments of the present invention provides a network device, including: at least one processor, a memory, a communications interface, and a bus, where the at least one processor, the memory, and the communications interface are connected and communicate with each other by using the bus, and the processor is configured to: invoke executable program code stored in the memory, and perform the following operations:

obtaining identity information and location information of a user terminal, and monitoring, according to the identity information and the location information, whether the user terminal has moved to a target region;

obtaining a target network quality level when it is detected that the user terminal has moved to the target region, where the target network quality level includes a current network quality level of the user terminal in the target region;

querying whether the user terminal has a historical network quality level in the target region; and when the user terminal has the historical network quality level in the target region, obtaining the historical network quality level, and evaluating network quality of the user terminal in the target region according to the historical network quality level and the target network quality level.

With reference to the third aspect, in a first possible implementation of the third aspect, the target network quality level further includes:

a regional network quality level of the target region.

With reference to the third aspect or the first possible implementation of the third aspect, in a second possible implementation of the third aspect, the obtaining the historical network quality level includes:

obtaining at least one historical network quality indicator record of the user terminal in the target region within preset time duration; and when a quantity of the historical network quality indicator records is greater than or equal to a preset threshold, calculating the historical network quality level of the user terminal in the target region according to the historical network quality indicator record.

With reference to the third aspect, in a third possible implementation of the third aspect, the evaluating network quality of the user terminal in the target region according to the historical network quality level and the target network quality level includes:

comparing the current network quality level with the historical network quality level, to obtain a difference between the current network quality level and the historical network quality level; and querying a preset difference-level mapping rule according to the difference, to determine a network quality level of the user terminal in the target region.

With reference to the first possible implementation of the third aspect, in a fourth possible implementation of the third aspect, the evaluating network quality of the user terminal in the target region according to the historical network quality level and the target network quality level includes:

calculating an average of the regional network quality level and the historical network quality level;

comparing the current network quality level with the average, to obtain a difference between the current network quality level and the average; and querying a preset difference-level mapping rule according to the difference between the current network quality level and the average, to determine a network quality level of the user terminal in the target region.

With reference to the first possible implementation of the third aspect or the fourth possible implementation of the third aspect, in a fifth possible implementation of the third aspect, the obtaining a target network quality level includes:

dividing a preset region into a plurality of subregions, where one of the subregions is the target region;

in each subregion, obtaining a historical network quality indicator of at least one user terminal within preset time duration, and performing network quality level feature construction on the historical network quality indicator of the at least one user terminal, to obtain a network quality level feature of the subregion; and clustering network quality level features of the plurality of subregions, and determining the regional network quality level of the target region according to a clustering result.

With reference to the fifth possible implementation of the third aspect, in a sixth possible implementation of the third aspect, when the user terminal does not have the historical network quality level in the target region, the processor is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the target network quality level.

With reference to the sixth possible implementation of the third aspect, in a seventh possible implementation of the third aspect, the evaluating the network quality of the user terminal in the target region according to the historical network quality level of the user terminal in any subregion other than the target region in the preset region and the target network quality level includes:

calculating an average of the historical network quality level of the user terminal in any subregion other than the target region in the preset region and the regional network quality level of the target region;

comparing the current network quality level with the average, to obtain a difference between the current network quality level and the average; and querying the preset difference-level mapping rule according to the difference between the current network quality level and the average, to determine the network quality level of the user terminal in the target region.

With reference to the fifth possible implementation of the third aspect, in an eighth possible implementation of the third aspect, when the user terminal does not have the historical network quality level in the target region, the processor is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the current network quality level.

With reference to the eighth possible implementation of the third aspect, in a ninth possible implementation of the third aspect, the evaluating the network quality of the user terminal in the target region according to the historical network quality level of the user terminal in any subregion other than the target region in the preset region and the current network quality level includes:

comparing the current network quality level with the historical network quality level of the user terminal in any subregion other than the target region in the preset region, to obtain a difference between the current network quality level and the historical network quality level of the user terminal in any subregion other than the target region in the preset region; and querying the preset difference-level mapping rule according to the difference, to determine the network quality level of the user terminal in the target region.

With reference to the fifth possible implementation of the third aspect, in a tenth possible implementation of the third aspect, when the user terminal does not have the historical network quality level in the target region, the processor is further configured to:

evaluate the network quality of the user terminal in the target region with reference to the regional network quality level and the current network quality level.

With reference to the tenth possible implementation of the third aspect, in an eleventh possible implementation of the third aspect, the evaluating the network quality of the user terminal in the target region with reference to the regional network quality level and the current network quality level includes:

comparing the current network quality level with the regional network quality level, to obtain a difference between the current network quality level and the regional network quality level; and querying the preset difference-level mapping rule according to the difference between the current network quality level and the regional network quality level, to determine the network quality level of the user terminal in the target region.

The network device queries whether the user terminal has the historical network quality level in the target region, and when the user terminal has the historical network quality level in the target region, the network device uses the historical network quality level as a reference factor for evaluating the network quality of the user terminal in the target region, so that a network quality evaluation result can reflect individual differences between different user terminals, and network service experience of different users can be evaluated more precisely, helping improve appropriateness and reliability of a network service quality evaluation result.

BRIEF DESCRIPTION OF DRAWINGS

To describe the technical solutions of the embodiments of the present invention more clearly, the following briefly describes the accompanying drawings required for describing the embodiments.

DESCRIPTION OF EMBODIMENTS

The following describes the embodiments of the present invention with reference to the accompanying drawings.

An embodiment of the present invention provides a network service quality evaluation method, applied to a network device, to evaluate network service quality of a user terminal connected to the network device. The network device may be an evolved Node B (eNB), a mobility management entity (MME), a serving GPRS support node (SGSN), or the like, and the user terminal may be a mobile phone, a tablet computer, or the like. The user terminal establishes a communication connection to the network device by using a wireless network, and transmits network service data to and exchanges network service data with the network device by using the wireless network. When the user terminal transmits the network service data to and exchanges the network service data with the network device, due to communication conditions such as a geographical location of the user terminal, surrounding environment of the user terminal, and performance of the terminal, network service quality may be different for different terminals and different service types. To improve service quality of a network service, network service quality of a user terminal in a region served by a network device needs to be evaluated appropriately, to adjust and improve the service quality of the network service in time according to an evaluation result, and improve network service experience of a user.

Figure 1:
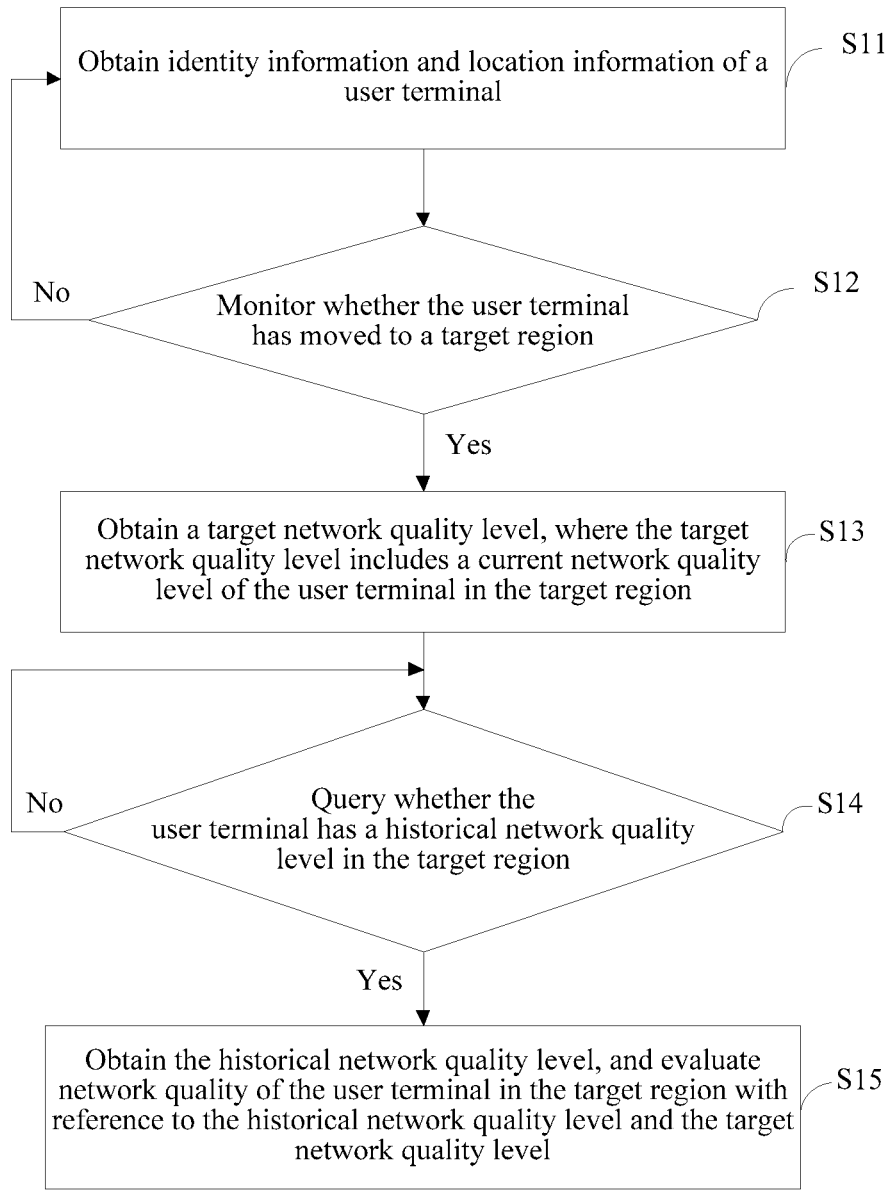
FIG. 1 is a schematic flowchart of a network service quality evaluation method according to an embodiment of the present invention.

Referring to FIG. 1, the network service quality evaluation method includes at least the following steps:

Step S11. Obtain identity information and location information of a user terminal.

Step S12. Monitor, according to the identity information and the location information, whether the user terminal has moved to a target region.

Step S13. Obtain a target network quality level when it is detected that the user terminal has moved to the target region, where the target network quality level includes a current network quality level of the user terminal in the target region.

Step S14. Query whether the user terminal has a historical network quality level in the target region.

Step S15. When the user terminal has the historical network quality level in the target region, obtain the historical network quality level, and evaluate network quality of the user terminal in the target region according to the historical network quality level and the target network quality level.

The target region may be a network cell of wireless communication, or any one of a plurality of subregions obtained by dividing the cell. For example, the network cell of wireless communication is divided into a plurality of subregions of 50 meters×50 meters, and the target region may be any one of the plurality of subregions of 50 meters× 50 meters. It may be understood that sizes of the plurality of subregions may be different.

The network service quality evaluation method in this embodiment of the present invention may be performed by the network device such as an eNB, an SGSN, or an MME. The network device communicates with the user terminal, to obtain the identity information and the location information of the user terminal, determines a current location of the user terminal, and obtains the current network quality level of the user terminal. Further, the network device obtains the target network quality level according to the identity information and the location information of the user terminal, where the target network quality level includes the current network quality level of the user terminal in the target region. The network device queries a historical running record of the network device to determine whether the user terminal has a historical network quality level in a region of the current location, and obtains the historical network quality level if the historical network quality level exists, and evaluates network quality of the user terminal at the current location according to the historical network quality level and the target network quality level.

In an embodiment of the present invention, the obtaining a target network quality level includes:

obtaining a current network quality indicator of the user terminal in the target region; and determining the current network quality level of the user terminal in the target region according to the current network quality indicator and a preset network quality level evaluation rule.

The current network quality indicator is a key quality indicator (KQI) of the user terminal, and the KQI may include a plurality of service quality parameters, for example, an access delay, an access success rate, and a data packet loss rate. The preset network quality level evaluation rule is used to define a mapping relationship between the KQI and a network quality level. A current KQI of the user terminal is obtained, and the current network quality level of the user terminal in the target region can be determined by querying the preset network quality level evaluation rule according to the current KQI. For example, the network quality level may be set to level 1 to level 100. The current network quality level of the user terminal in the target region may be any level in level 1 to level 100 according to different current KQIs. That is, the preset network quality level evaluation rule is used to establish mapping relationships between different KQIs and network quality levels. It may be understood that the preset network quality level evaluation rule may be set according to a precision requirement for network quality evaluation.

In an embodiment of the present invention, the obtaining the historical network quality level includes:

obtaining at least one historical network quality indicator record of the user terminal in the target region within preset time duration; and when a quantity of the historical network quality indicator records is greater than or equal to a preset threshold, calculating the historical network quality level of the user terminal in the target region according to the historical network quality indicator record.

For example, the preset time duration may be time duration not exceeding one month from a current time, and the preset threshold may be set to 20. The historical network quality indicator is a historical KQI of the user terminal in the target region. When it is found that the quantity of the historical network quality indicator records of the user terminal in the target region within the time duration not exceeding one month from the current time is greater than or equal to 20, the historical network quality level of the user terminal in the target region is calculated according to the historical network quality indicator records.

Specifically, the historical network quality indicators of the user terminal in the target region within the time duration not exceeding one month from the current time may be clustered, and the historical network quality level of the user terminal in the target region is determined according to a clustering result and the preset network quality level evaluation rule. Alternatively, an average or a median of the historical network quality indicators of the user terminal in the target region within the time duration not exceeding one month from the current time may be calculated, and the historical network quality level of the user terminal in the target region is determined according to the average or the median and the preset network quality level evaluation rule.

In an embodiment of the present invention, the evaluating network quality of the user terminal in the target region according to the historical network quality level and the target network quality level includes:

comparing the current network quality level with the historical network quality level, to obtain a difference between the current network quality level and the historical network quality level; and querying a preset difference-level mapping rule according to the difference, to determine a network quality level of the user terminal in the target region, where the preset difference-level mapping rule is used to establish mapping relationships between different differences and network quality levels.

It may be understood that the difference between the current network quality level and the historical network quality level may be obtained by subtracting the historical network quality level from the current network quality level, or may be obtained by subtracting the current network quality level from the historical network quality level.

For example, when the difference is obtained by subtracting the historical network quality level from the current network quality level, the preset difference-level mapping rule may include the following mapping relationships between differences and network quality levels: 1. If the difference is greater than or equal to zero, that is, the current network quality level is greater than or equal to the historical network quality level, a corresponding network quality level is level 1; 2. if the difference is less than zero, and an absolute value of the difference is less than 20% of the historical network quality level, that is, the current network quality level is less than the historical network quality level by less than 20% of the historical network quality level, a corresponding network quality level is level 2; 3. if the difference is less than zero, and an absolute value of the difference is greater than or equal to 20% of the historical network quality level and less than 40% of the historical network quality level, that is, the current network quality level is less than the historical network quality level by 20% to 40% of the historical network quality level, a corresponding network quality level is level 3; and so on. Therefore, fine evaluation can be performed on the network quality level of the user terminal in the target region according to different ranges of the difference between the current network quality level and the historical network quality level.

It may be understood that the foregoing example of the preset difference-level mapping rule is merely used to describe the specific principle of the preset difference-level mapping rule, and is not intended to limit the present invention in any form. Network quality levels corresponding to different differences and included in the preset difference-level mapping rule are not limited to level 1, level 2, and level 3 in the foregoing example, and more levels may be obtained through classification according to a fine requirement for network quality evaluation. For example, network quality may be classified into corresponding level 1 to level 100 according to different ranges of the difference between the current network quality level and the historical network quality level.

In this embodiment, the current network quality of the user terminal in the target region is evaluated according to the historical network quality level and the current network quality level of the user terminal in the target region, so that individual differences between different user terminals can be reflected, and appropriateness of a network quality evaluation result can be improved. In addition, the mapping relationships between different differences and network quality levels are established by using the preset difference-level mapping rule, so that fine evaluation can be performed on the network quality of the user terminal in the target region, and network quality evaluation precision can be improved.

In an embodiment of the present invention, the target network quality level further includes a regional network quality level of the target region, and the obtaining a target network quality level includes:

obtaining a historical network quality indicator of at least one user terminal that has arrived at the target region within the preset time duration; and calculating the regional network quality level of the target region according to the historical network quality indicator of the at least one user terminal that has arrived at the target region within the preset time duration.

For example, the preset time duration may be one week. Historical KQIs of a plurality of user terminals that have arrived at the target region within one week before a current week are obtained, and an average or a median of the KQIs of the plurality of user terminals is calculated, or the KQIs of the plurality of user terminals are clustered, to obtain a regional historical KQI of the target region within one week before the current week. A historical network quality level of the target region within one week before the current week is determined according to the regional historical KQI and the preset network quality level evaluation rule, and the historical network quality level is used as the regional network quality level of the target region within the current week.

In an embodiment of the present invention, the evaluating network quality of the user terminal in the target region according to the historical network quality level and the target network quality level includes:

calculating an average of the regional network quality level and the historical network quality level;

comparing the current network quality level with the average, to obtain a difference between the current network quality level and the average; and querying the preset difference-level mapping rule according to the difference, to determine the network quality level of the user terminal in the target region, where the preset difference-level mapping rule is used to establish mapping relationships between different differences and network quality levels.

It may be understood that the difference between the current network quality level and the average may be obtained by subtracting the average from the current network quality level, or may be obtained by subtracting the current network quality level from the average.

For the specific principle of the preset difference-level mapping rule, refer to the related description in the foregoing embodiment, and details are not described herein again.

In this embodiment, the network quality of the user terminal in the target region is evaluated according to the historical network quality level of the user terminal in the target region and the regional network quality level, so that individual differences between different user terminals and spatial and temporal differences between the user terminals can be reflected, and a network quality evaluation result is more appropriate and reliable.

Figure 2:
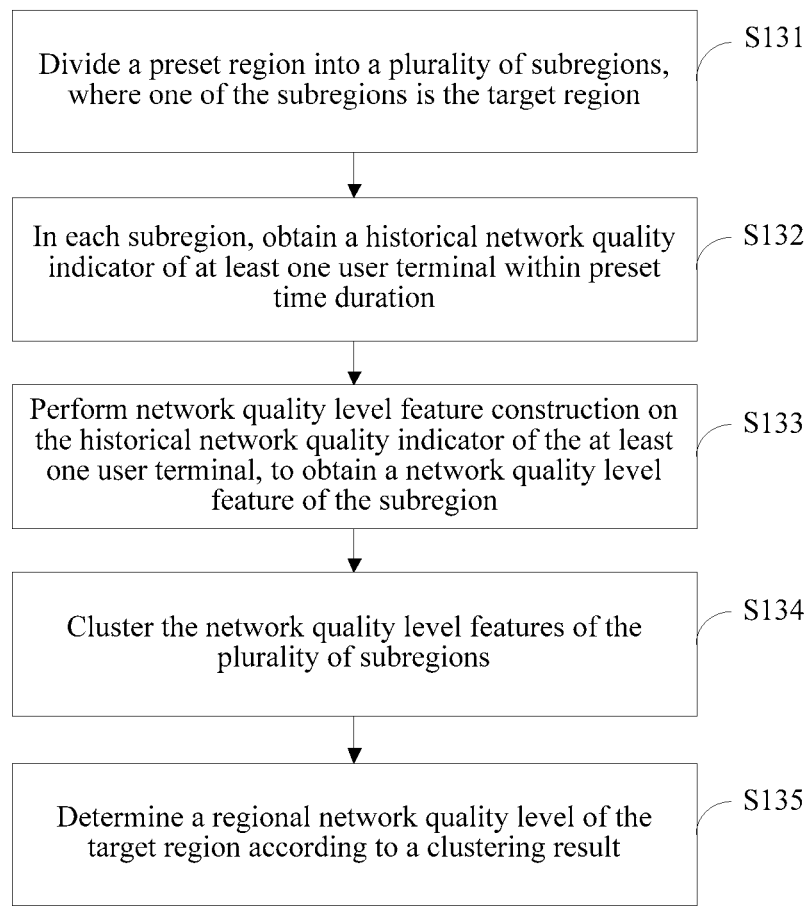
FIG. 2 is a schematic diagram of a subflow of a network service quality evaluation method according to an embodiment of the present invention.

Referring to FIG. 2, in an embodiment of the present invention, the obtaining a regional network quality level of the target region includes the following steps:

Step S131. Divide a preset region into a plurality of subregions, where one of the subregions is the target region.

Step S132. In each subregion, obtain a historical network quality indicator of at least one user terminal within preset time duration.

Step S133. Perform network quality level feature construction on the historical network quality indicator of the at least one user terminal, to obtain a network quality level feature of the subregion.

Step S134. Cluster the network quality level features of the plurality of subregions.

Step S135. Determine the regional network quality level of the target region according to a clustering result.

Specifically, the preset region may be a network cell of wireless communication, a size of the subregion may be set to 50 meters×50 meters, and the preset time duration may be one week. The network cell of wireless communication is divided into a plurality of grid-shaped subregions of 50 meters×50 meters, and a historical KQI of at least one user terminal within one week before a current week in each subregion is obtained. Network quality level feature construction is performed on the historical KQI of the at least one user terminal, to obtain a network quality level feature of the subregion. The network quality level features of the plurality of subregions are clustered, to obtain a regional historical KQI corresponding to each subregion. Further, a historical network quality level of the target region within one week before the current week is determined according to the regional historical KQI corresponding to the target region and the preset network quality level evaluation rule, and the historical network quality level is used as a regional network quality level of the target region within the current week.

The performing network quality level feature construction on the historical KQI of the at least one user terminal may be: in each subregion, if there is only a historical KQI of one user terminal within one week before the current week, using the historical KQI of the user terminal as a historical KQI of the subregion, and determining a network quality level feature of the subregion according to the historical KQI of the subregion and the preset network quality level evaluation rule; or if there are historical KQIs of a plurality of user terminals within one week before the current week, obtaining an average or a median of the historical KQIs of the plurality of user terminals, using one group of KQIs obtained after the average or the median is obtained as a historical KQI of the subregion, and determining a network quality level feature of the subregion according to the historical KQI of the subregion and the preset network quality level evaluation rule. After the network quality level feature of each subregion is obtained, the network quality level features of the plurality of subregions are clustered, to obtain N clustering results. That is, the network quality level features of the plurality of subregions are classified into N different categories. Network quality level marking is performed on the N clustering results, and a regional network quality level corresponding to each subregion is determined, to determine the regional network quality level of the target region. N is greater than or equal to 1, and N is less than or equal to a quantity of the subregions.

In this embodiment, the network cell is divided into the plurality of subregions, where one of the subregions is the target region, the historical KQI of at least one user terminal in each subregion within the preset time duration is obtained to construct the network quality level feature of the subregion, the network quality level features of the plurality of subregions are clustered, and the regional network quality level of the target region is determined according to the clustering result, so that region division for network quality evaluation is finer. In addition, the network quality level features of the plurality of subregions are clustered to determine the regional network quality level of the target region, helping improve precision of evaluating the regional network quality level of the target region, thereby improving appropriateness and reliability of network quality evaluation.

In an embodiment of the present invention, when the user terminal does not have the historical network quality level in the target region, the method further includes:

obtaining a historical network quality level of the user terminal in any subregion other than the target region in the preset region; and evaluating the network quality of the user terminal in the target region according to the historical network quality level of the user terminal in any subregion other than the target region in the preset region and the target network quality level.

For a specific step of obtaining a historical network quality level of the user terminal in any subregion other than the target region in the preset region, refer to the description in the embodiment shown in FIG. 1, and details are not described herein again.

Specifically, the evaluating the network quality of the user terminal in the target region according to the historical network quality level of the user terminal in any subregion other than the target region in the preset region and the target network quality level includes:

calculating an average of the historical network quality level of the user terminal in any subregion other than the target region in the preset region and the regional network quality level of the target region;

comparing the current network quality level with the average, to obtain a difference between the current network quality level and the average; and querying the preset difference-level mapping rule according to the difference, to determine the network quality level of the user terminal in the target region, where the preset difference-level mapping rule is used to establish mapping relationships between different differences and network quality levels.

It may be understood that the difference between the current network quality level and the average may be obtained by subtracting the average from the current network quality level, or may be obtained by subtracting the current network quality level from the average.

For the specific principle of the preset difference-level mapping rule, refer to the related description in the foregoing embodiment, and details are not described herein again.

In this embodiment, when the user terminal does not have the historical network quality level in the target region, the network quality of the user terminal in the target region is evaluated according to the historical network quality level of any subregion other than the target region in the preset region. Because the referenced subregion and the target region belong to the same preset region, it can be ensured that a communication condition in the referenced subregion is similar to a communication condition in the target region. Therefore, when the network quality of the user terminal in the target region is evaluated by using the historical network quality level of any subregion as a reference and with reference to the regional network quality level of the target region, an evaluation result can still reflect individual differences between different user terminals when there is no historical network quality level of the target region, thereby improving appropriateness of a network quality evaluation result.

It may be understood that, when the user terminal does not have the historical network quality level in the target region, the method further includes:

obtaining a historical network quality level of the user terminal in any subregion other than the target region in the preset region; and evaluating the network quality of the user terminal in the target region according to the historical network quality level of the user terminal in any subregion other than the target region in the preset region and the current network quality level.

Specifically, the evaluating the network quality of the user terminal in the target region according to the historical network quality level of the user terminal in any subregion other than the target region in the preset region and the current network quality level includes:

comparing the current network quality level with the historical network quality level of the user terminal in any subregion other than the target region in the preset region, to obtain a difference between the current network quality level and the historical network quality level of the user terminal in any subregion other than the target region in the preset region; and querying the preset difference-level mapping rule according to the difference, to determine the network quality level of the user terminal in the target region, where the preset difference-level mapping rule is used to establish mapping relationships between different differences and network quality levels.

It may be understood that the difference between the current network quality level and the historical network quality level of the user terminal in any subregion other than the target region in the preset region may be obtained by subtracting the historical network quality level of the user terminal in any subregion other than the target region in the preset region from the current network quality level, or may be obtained by subtracting the current network quality level from the historical network quality level of the user terminal in any subregion other than the target region in the preset region. For the specific principle of the preset difference-level mapping rule, refer to the related description in the foregoing embodiment, and details are not described herein again.

In an embodiment of the present invention, when the user terminal does not have the historical network quality level in the target region, the network quality of the user terminal in the target region may further be evaluated with reference to the regional network quality level and the current network quality level, specifically including the following steps:

comparing the current network quality level with the regional network quality level, to obtain a difference between the current network quality level and the regional network quality level; and querying the preset difference-level mapping rule according to the difference, to determine the network quality level of the user terminal in the target region, where the preset difference-level mapping rule is used to establish mapping relationships between different differences and network quality levels.

It may be understood that the difference between the current network quality level and the regional network quality level may be obtained by subtracting the regional network quality level from the current network quality level, or may be obtained by subtracting the current network quality level from the regional network quality level. For the specific principle of the preset difference-level mapping rule, refer to the related description in the foregoing embodiment, and details are not described herein again.

It may be understood that in an embodiment of the present invention, the current network quality indicator may be a current KQI corresponding to a particular service type of the user terminal, the regional network quality indicator may be a regional KQI corresponding to the particular service type in the target region, and the historical network quality indicator may be a historical KQI corresponding to the particular service type of the user terminal. For example, the particular service type may be a video call service, and the corresponding KQI may be an indicator such as video fluency, definition, or a voice and video synchronization degree.

Figure 3:
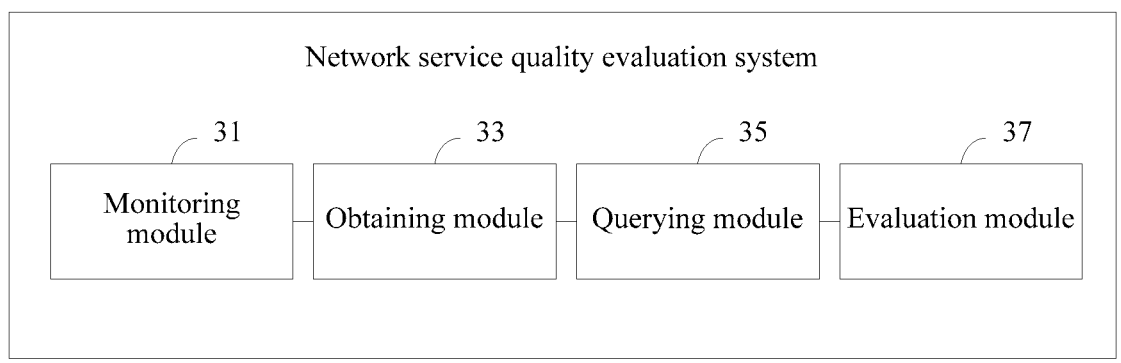
FIG. 3 is a schematic structural diagram of a network service quality evaluation system according to an embodiment of the present invention.

Referring to FIG. 3, an embodiment of the present invention provides a network service quality evaluation system 30, applied to a network device such as an eNB, an SGSN, or an MME, to evaluate network service quality of a user terminal connected to the network device. The network service quality evaluation system 30 includes:

a monitoring module 31, configured to: obtain identity information and location information of a user terminal, and monitor, according to the identity information and the location information, whether the user terminal has moved to a target region;

an obtaining module 33, configured to obtain a target network quality level when it is detected that the user terminal has moved to the target region, where the target network quality level includes a current network quality level of the user terminal in the target region;

a querying module 35, configured to query whether the user terminal has a historical network quality level in the target region; and an evaluation module 37, configured to: when the user terminal has the historical network quality level in the target region, obtain the historical network quality level, and evaluate network quality of the user terminal in the target region according to the historical network quality level and the target network quality level.

Figure 4:
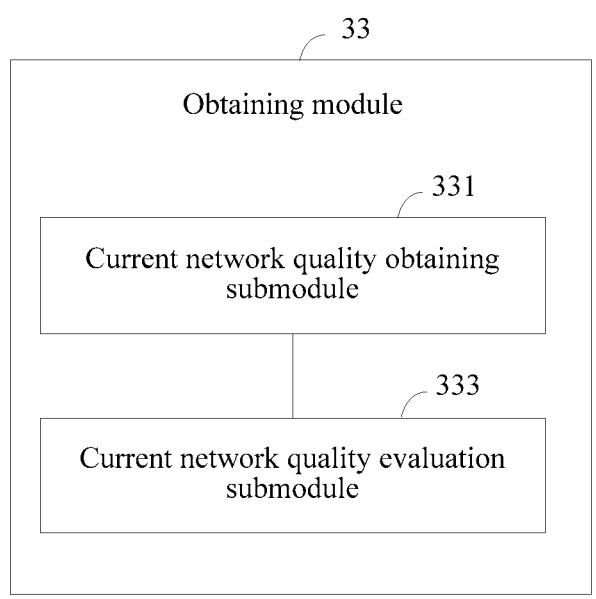
FIG. 4 is a schematic structural diagram of an obtaining module of the network service quality evaluation system shown in FIG. 3.

Referring to FIG. 4, in an embodiment of the present invention, the obtaining module 33 includes:

a current network quality obtaining submodule 331, configured to obtain a current network quality indicator of the user terminal in the target region; and a current network quality evaluation submodule 333, configured to determine the current network quality level of the user terminal in the target region according to a current network quality indicator and a preset network quality level evaluation rule.

In an embodiment of the present invention, the target network quality level further includes:

a regional network quality level of the target region.

Figure 5:
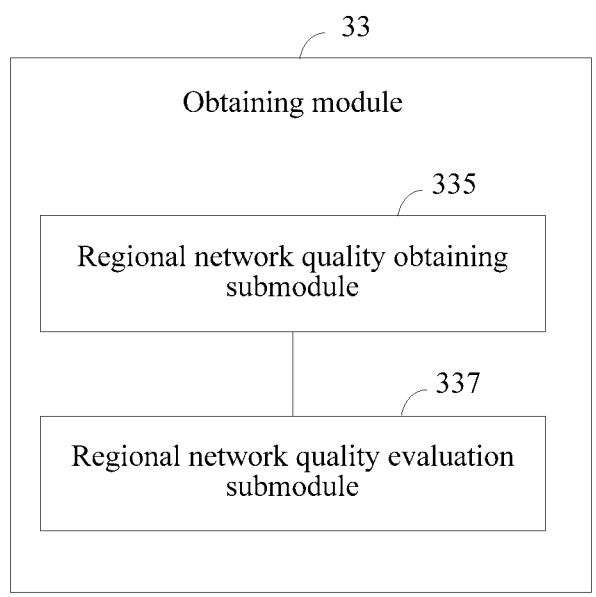
FIG. 5 is another schematic structural diagram of an obtaining module of the network service quality evaluation system shown in FIG. 3.

Referring to FIG. 5, in an embodiment of the present invention, the obtaining module 33 further includes:

a regional network quality obtaining submodule 335, configured to obtain a historical network quality indicator of at least one user terminal that has arrived at the target region within preset time duration; and a regional network quality evaluation submodule 337, configured to calculate the regional network quality level of the target region according to the historical network quality indicator of the at least one user terminal that has arrived at the target region within the preset time duration.

In an embodiment of the present invention, the evaluation module 37 is further configured to:

obtain a historical network quality indicator record of the user terminal in the target region within preset time duration; and when a quantity of the historical network quality indicator records is greater than or equal to a preset threshold, calculate the historical network quality level of the user terminal in the target region according to the historical network quality indicator record.

In an embodiment of the present invention, the evaluation module 37 is further configured to:

compare the current network quality level with the historical network quality level, to obtain a difference between the current network quality level and the historical network quality level; and query a preset difference-level mapping rule according to the difference, to determine a network quality level of the user terminal in the target region.

In an embodiment of the present invention, the evaluation module 37 is further configured to:

calculate an average of the regional network quality level and the historical network quality level;

compare the current network quality level with the average, to obtain a difference between the current network quality level and the average; and query a preset difference-level mapping rule according to the difference between the current network quality level and the average, to determine a network quality level of the user terminal in the target region.

Figure 6:
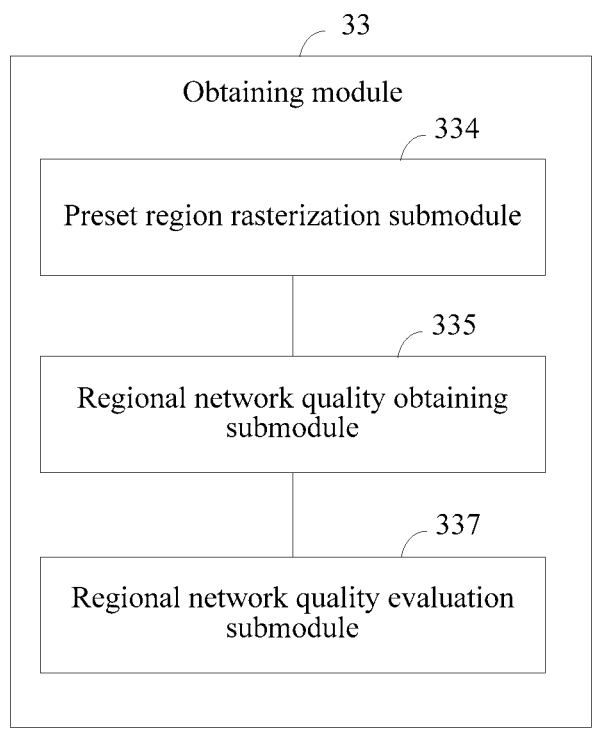
FIG. 6 is still another schematic structural diagram of an obtaining module of the network service quality evaluation system shown in FIG. 3.

Referring to FIG. 6, in an embodiment of the present invention, the obtaining module 33 further includes:

a preset region rasterization submodule 334, configured to divide a preset region into a plurality of subregions, where one of the subregions is the target region;

a regional network quality obtaining submodule 335, configured to: in each subregion, obtain a historical network quality indicator of at least one user terminal with preset time duration, and perform network quality level feature construction on the historical network quality indicator of the at least one user terminal, to obtain a network quality level feature of the subregion; and a regional network quality evaluation submodule 337, configured to: cluster network quality level features of the plurality of subregions, and determine the regional network quality level of the target region according to a clustering result.

In an embodiment of the present invention, when the user terminal does not have the historical network quality level in the target region, the evaluation module 37 is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the target network quality level.

In an embodiment of the present invention, the evaluation module 37 is further configured to:

calculate an average of the historical network quality level of the user terminal in any subregion other than the target region in the preset region and the regional network quality level of the target region;

compare the current network quality level with the average, to obtain a difference between the current network quality level and the average; and query the preset difference-level mapping rule according to the difference between the current network quality level and the average, to determine the network quality level of the user terminal in the target region.

In an embodiment of the present invention, when the user terminal does not have the historical network quality level in the target region, the evaluation module 37 is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the current network quality level.

Specifically, the evaluating the network quality of the user terminal in the target region according to the historical network quality level of the user terminal in any subregion other than the target region in the preset region and the current network quality level includes:

comparing the current network quality level with the historical network quality level of the user terminal in any subregion other than the target region in the preset region, to obtain a difference between the current network quality level and the historical network quality level of the user terminal in any subregion other than the target region in the preset region; and querying the preset difference-level mapping rule according to the difference, to determine the network quality level of the user terminal in the target region.

In an embodiment of the present invention, when the user terminal does not have the historical network quality level in the target region, the evaluation module 37 is further configured to:

evaluate the network quality of the user terminal in the target region with reference to the regional network quality level and the current network quality level.

In an embodiment of the present invention, the evaluation module 37 is further configured to:

compare the current network quality level with the regional network quality level, to obtain a difference between the current network quality level and the regional network quality level; and query the preset difference-level mapping rule according to the difference between the current network quality level and the regional network quality level, to determine the network quality level of the user terminal in the target region.

It may be understood that for functions and specific implementations of the modules in the network service quality evaluation system 30, refer to the related descriptions of the method embodiments shown in FIG. 1 and FIG. 2, and details are not described herein again.

Figure 7:
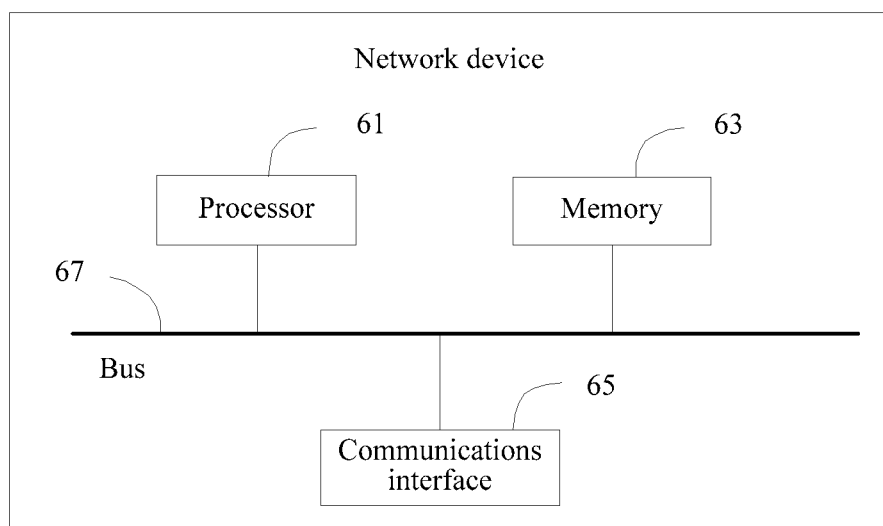
FIG. 7 is a schematic structural diagram of a network device according to an embodiment of the present invention.

Referring to FIG. 7, an embodiment of the present invention provides a network device 60, including at least one processor 61, a memory 63, a communications interface 65, and a bus 67. The at least one processor 61, the memory 63, and the communications interface 65 are connected and communicate with each other by using the bus 67. The memory 63 is configured to store executable program code and a historical communication record of the network device 60. The communications interface 65 is configured to establish a communication connection to the user terminal. The processor 61 is configured to: invoke the executable program code stored in the memory 63, and perform the following operations:

obtaining, by using the communications interface 65, identity information and location information of a user terminal, and monitoring, according to the identity information and the location information, whether the user terminal has moved to a target region;

obtaining a target network quality level when it is detected that the user terminal has moved to the target region, where the target network quality level includes a current network quality level of the user terminal in the target region;

querying whether the user terminal has a historical network quality level in the target region; and when the user terminal has the historical network quality level in the target region, obtaining the historical network quality level, and evaluating network quality of the user terminal in the target region according to the historical network quality level and the target network quality level.

It may be understood that the historical communication record stored in the memory 63 may include identity information of all user terminals that have previously been in communication connection to the network device 60 and historical network quality indicator records corresponding to the identity information.

In an embodiment of the present invention, the obtaining a target network quality level includes:

obtaining a current network quality indicator of the user terminal in the target region; and determining the current network quality level of the user terminal in the target region according to the current network quality indicator and a preset network quality level evaluation rule.

In an embodiment of the present invention, the target network quality level further includes:

a regional network quality level of the target region.

In an embodiment of the present invention, the obtaining the historical network quality level includes:

obtaining, from the memory 63, a historical network quality indicator record of the user terminal in the target region within preset time duration; and when a quantity of the historical network quality indicator records is greater than or equal to a preset threshold, calculating the historical network quality level of the user terminal in the target region according to the historical network quality indicator record.

In an embodiment of the present invention, the evaluating network quality of the user terminal in the target region according to the historical network quality level and the target network quality level includes:

comparing the current network quality level with the historical network quality level, to obtain a difference between the current network quality level and the historical network quality level; and querying a preset difference-level mapping rule according to the difference, to determine a network quality level of the user terminal in the target region.

In an embodiment of the present invention, the evaluating network quality of the user terminal in the target region according to the historical network quality level and the target network quality level includes:

calculating an average of the regional network quality level and the historical network quality level;

comparing the current network quality level with the average, to obtain a difference between the current network quality level and the average; and querying a preset difference-level mapping rule according to the difference between the current network quality level and the average, to determine a network quality level of the user terminal in the target region.

In an embodiment of the present invention, when the user terminal does not have the historical network quality level in the target region, the processor is further configured to:

evaluate the network quality of the user terminal in the target region with reference to the regional network quality level and the current network quality level.

In an embodiment of the present invention, the evaluating network quality of the user terminal in the target region with reference to the regional network quality level and the current network quality level includes:

comparing the current network quality level with the regional network quality level, to obtain a difference between the current network quality level and the regional network quality level; and querying the preset difference-level mapping rule according to the difference between the current network quality level and the regional network quality level, to determine the network quality level of the user terminal in the target region.

In an embodiment of the present invention, the obtaining a target network quality level includes:

obtaining, from the memory 63, a historical network quality indicator of at least one user terminal that has arrived at the target region within preset time duration; and calculating the regional network quality level of the target region according to the historical network quality indicator of the at least one user terminal that has arrived at the target region within the preset time duration.

In an embodiment of the present invention, the obtaining a target network quality level includes:

dividing a preset region into a plurality of subregions, where one of the subregions is the target region;

in each subregion, obtaining a historical network quality indicator of at least one user terminal within preset time duration, and performing network quality level feature construction on the historical network quality indicator of the at least one user terminal, to obtain a network quality level feature of the subregion; and clustering network quality level features of the plurality of subregions, and determining the regional network quality level of the target region according to a clustering result.

In an embodiment of the present invention, when the user terminal does not have the historical network quality level in the target region, the processor 61 is further configured to:

obtain, from the memory 63, a historical network quality level of the user terminal in any subregion other than the target region in the preset region; and evaluate the network quality of the user terminal in the target region according to the historical network quality level of the user terminal in any subregion other than the target region in the preset region and the target network quality level.

In an embodiment of the present invention, the evaluating the network quality of the user terminal in the target region according to the historical network quality level of the user terminal in any subregion other than the target region in the preset region and the target network quality level includes:

calculating an average of the historical network quality level of the user terminal in any subregion other than the target region in the preset region and the regional network quality level of the target region;

comparing the current network quality level with the average, to obtain a difference between the current network quality level and the average; and querying the preset difference-level mapping rule according to the difference between the current network quality level and the average, to determine the network quality level of the user terminal in the target region.

In an embodiment of the present invention, when the user terminal does not have the historical network quality level in the target region, the processor 61 is further configured to:

obtain a historical network quality level of the user terminal in any subregion other than the target region in the preset region; and evaluate the network quality of the user terminal in the target region according to the historical network quality level of the user terminal in any subregion other than the target region in the preset region and the current network quality level.

In an embodiment of the present invention, the evaluating the network quality of the user terminal in the target region according to the historical network quality level of the user terminal in any subregion other than the target region in the preset region and the current network quality level includes:

comparing the current network quality level with the historical network quality level of the user terminal in any subregion other than the target region in the preset region, to obtain a difference between the current network quality level and the historical network quality level of the user terminal in any subregion other than the target region in the preset region; and query the preset difference-level mapping rule according to the difference, to determine the network quality level of the user terminal in the target region.

It may be understood that the preset time duration, the preset threshold of the quantity of the historical network quality indicator records, and the preset difference-level mapping rule may all be preset according to a precision requirement for network quality evaluation, and are stored in the memory 63, so that the processor 61 invokes them when executing the executable program code.

It may be understood that, the network device 60 may be an evolved Node B (eNB), a mobility management entity (MME), a serving GPRS support node (SGSN), or the like, and the user terminal may be a mobile phone, a tablet computer, or the like.

It may be understood that for specific steps and implementations of the operations performed by the processor 61, refer to the related descriptions of the method embodiments shown in FIG. 1 and FIG. 2, and details are not described herein again.

What is claimed is:

1. A network service quality evaluation method, comprising:

obtaining identity information and location information of a user terminal, and monitoring, according to the identity information and the location information, whether the user terminal has moved to a target region;

obtaining a target network quality level when it is detected that the user terminal has moved to the target region, wherein the target network quality level comprises:
   a current network quality level of the user terminal in the target region; and
   a regional network quality level of the target region;

querying whether the user terminal has a historical network quality level in the target region; and when the user terminal has the historical network quality level in the target region, obtaining the historical network quality level by:
   obtaining at least one historical network quality indicator record of the user terminal in the target region within preset time duration; and
   when a quantity of the historical network quality indicator records is greater than or equal to a preset threshold, calculating the historical network quality level of the user terminal in the target region according to the historical network quality indicator record; and evaluating network quality of the user terminal in the target region according to the historical network quality level and the target network quality level, wherein evaluating the network quality of the user terminal in the target region according to the historical network quality level and the target network quality level comprises:
   calculating an average of the regional network quality level and the historical network quality level;
   comparing the current network quality level with the average, to obtain a difference between the current network quality level and the average; and
   querying a preset difference-level mapping rule according to the difference between the current network quality level and the average, to determine a network quality level of the user terminal in the target region.

2. The method according to claim 1, wherein evaluating the network quality of the user terminal in the target region according to the historical network quality level and the target network quality level comprises:
   comparing the current network quality level with the historical network quality level, to obtain a difference between the current network quality level and the historical network quality level; and
   querying a preset difference-level mapping rule according to the difference, to determine a network quality level of the user terminal in the target region.

3. The method according to claim 1, wherein obtaining the target network quality level comprises:
   dividing a preset region into a plurality of subregions, wherein one of the subregions is the target region;
   in each subregion, obtaining a historical network quality indicator of at least one user terminal within preset time duration, and performing network quality level feature construction on the historical network quality indicator of the at least one user terminal, to obtain a network quality level feature of the subregion; and
   clustering network quality level features of the plurality of subregions, and determining the regional network quality level of the target region according to a clustering result.

4. The method according to claim 3, wherein when the user terminal does not have the historical network quality level in the target region, the method further comprises:
   obtaining a historical network quality level of the user terminal in any subregion other than the target region in the preset region; and
   evaluating the network quality of the user terminal in the target region according to the historical network quality level of the user terminal in any subregion other than the target region in the preset region and the target network quality level.

5. The method according to claim 4, wherein evaluating the network quality of the user terminal in the target region according to the historical network quality level of the user terminal in any subregion other than the target region in the preset region and the target network quality level comprises:
   calculating an average of the historical network quality level of the user terminal in any subregion other than the target region in the preset region and the regional network quality level of the target region;
   comparing the current network quality level with the average, to obtain a difference between the current network quality level and the average; and
   querying a preset difference-level mapping rule according to the difference between the current network quality level and the average, to determine the network quality level of the user terminal in the target region.

6. A network service quality evaluation system, comprising:
   a monitoring module, configured to: obtain identity information and location information of a user terminal, and monitor, according to the identity information and the location information, whether the user terminal has moved to a target region;
   an obtaining module, configured to obtain a target network quality level when it is detected that the user terminal has moved to the target region, wherein the target network quality level comprises:
      a current network quality level of the user terminal in the target region; and a regional network quality level of the target region;
a querying module, configured to query whether the user terminal has a historical network quality level in the target region; and
an evaluation module, configured to:
obtain a historical network quality level when the user terminal has the historical network quality level in the target region, by:
comparing the current network quality level with the historical network quality level to obtain a difference between the current network quality level and the historical network quality level; and
querying a preset difference-level mapping rule according to the difference to determine a network quality level of the user terminal in the target region; and
evaluate network quality of the user terminal in the target region according to the historical network quality level and the target network quality level;
calculate an average of the regional network quality level and the historical network quality level;
compare the current network quality level with the average, to obtain a difference between the current network quality level and the average; and
query a preset difference-level mapping rule according to the difference between the current network quality level and the average, to determine a network quality level of the user terminal in the target region.

7. The system according to claim 6, wherein the evaluation module is further configured to:
compare the current network quality level with the historical network quality level, to obtain a difference between the current network quality level and the historical network quality level; and
query a preset difference-level mapping rule according to the difference, to determine a network quality level of the user terminal in the target region.

8. The system according to claim 6, wherein the obtaining module-comprises:
a preset region rasterization submodule, configured to divide a preset region into a plurality of subregions, wherein one of the subregions is the target region;
a regional network quality obtaining submodule, configured to: in each subregion, obtain a historical network quality indicator of at least one user terminal with preset time duration, and perform network quality level feature construction on the historical network quality indicator of the at least one user terminal to obtain a network quality level feature of the subregion; and
a regional network quality evaluation submodule, configured to: cluster network quality level features of the plurality of subregions, and determine the regional network quality level of the target region according to a clustering result.

9. The system according to claim 8, wherein when the user terminal does not have the historical network quality level in the target region, the evaluation module is further configured to:
obtain a historical network quality level of the user terminal in any subregion other than the target region in the preset region; and
evaluate the network quality of the user terminal in the target region according to the historical network quality level of the user terminal in any subregion other than the target region in the preset region and the target network quality level.

10. The system according to claim 9, wherein the evaluation module is further configured to:
calculate an average of the historical network quality level of the user terminal in any subregion other than the target region in the preset region and the regional network quality level of the target region;
compare the current network quality level with the average to obtain a difference between the current network quality level and the average; and
query the preset difference-level mapping rule according to the difference between the current network quality level and the average to determine the network quality level of the user terminal in the target region.

11. A network device, comprising: at least one processor, memory, a communications interface, and a bus, wherein the at least one processor, the memory, and the communications interface are connected and communicate with each other by using the bus, and the processor is configured to invoke executable program code stored in the memory, and perform:
obtaining identity information and location information of a user terminal, and monitoring, according to the identity information and the location information, whether the user terminal has moved to a target region;
obtaining a target network quality level when it is detected that the user terminal has moved to the target region, wherein the target network quality level comprises:
a current network quality level of the user terminal in the target region; and
a regional network quality level of the target region;
querying whether the user terminal has a historical network quality level in the target region; and
when the user terminal has the historical network quality level in the target region, obtaining the historical network quality level by:
obtaining at least one historical network quality indicator record of the user terminal in the target region within preset time duration; and
when a quantity of the historical network quality indicator records is greater than or equal to a preset threshold, calculating the historical network quality level of the user terminal in the target region according to the historical network quality indicator record; and
evaluating network quality of the user terminal in the target region according to the historical network quality level and the target network quality level, wherein evaluating the network quality of the user terminal in the target region according to the historical network quality level and the target network quality level comprises:
calculating an average of the regional network quality level and the historical network quality level;
comparing the current network quality level with the average, to obtain a difference between the current network quality level and the average; and
querying a preset difference-level mapping rule according to the difference between the current network quality level and the average, to determine a network quality level of the user terminal in the target region.

12. The network device according to claim 11, wherein evaluating the network quality of the user terminal in the target region according to the historical network quality level and the target network quality level comprises:
comparing the current network quality level with the historical network quality level, to obtain a difference between the current network quality level and the historical network quality level; and querying a preset difference-level mapping rule according to the difference, to determine a network quality level of the user terminal in the target region.

13. The network device according to claim 11, wherein the obtaining a target network quality level comprises:

dividing a preset region into a plurality of subregions, wherein one of the subregions is the target region;

in each subregion, obtaining a historical network quality indicator of at least one user terminal within preset time duration, and performing network quality level feature construction on the historical network quality indicator of the at least one user terminal, to obtain a network quality level feature of the subregion; and clustering network quality level features of the plurality of subregions, and determining the regional network quality level of the target region according to a clustering result.

14. The network device according to claim 13, wherein when the user terminal does not have the historical network quality level in the target region, the processor is further configured to perform:

obtaining a historical network quality level of the user terminal in any subregion other than the target region in the preset region; and evaluating the network quality of the user terminal in the target region according to the historical network quality level of the user terminal in any subregion other than the target region in the preset region and the target network quality level.

15. The network device according to claim 14, wherein evaluating the network quality of the user terminal in the target region according to the historical network quality level of the user terminal in any subregion other than the target region in the preset region and the target network quality level comprises:

calculating an average of the historical network quality level of the user terminal in any subregion other than the target region in the preset region and the regional network quality level of the target region;

comparing the current network quality level with the average, to obtain a difference between the current network quality level and the average; and querying a preset difference-level mapping rule according to the difference between the current network quality level and the average, to determine the network quality level of the user terminal in the target region.

* * * * *